Figure 4:
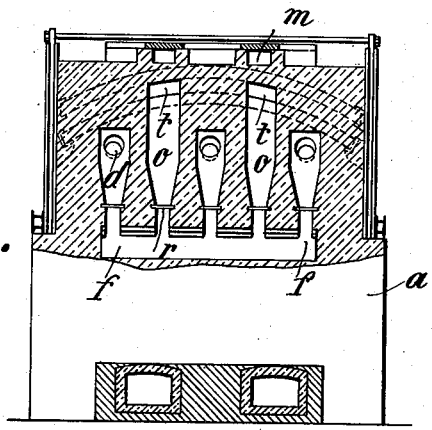

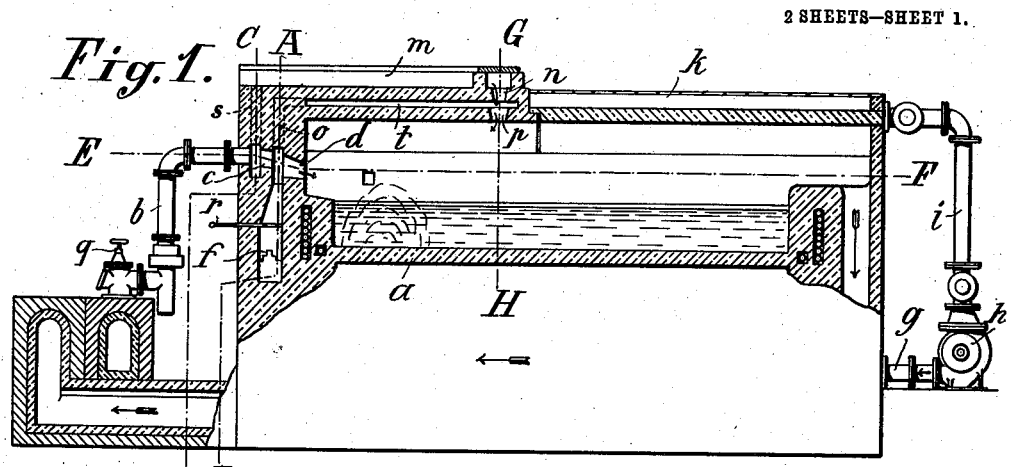
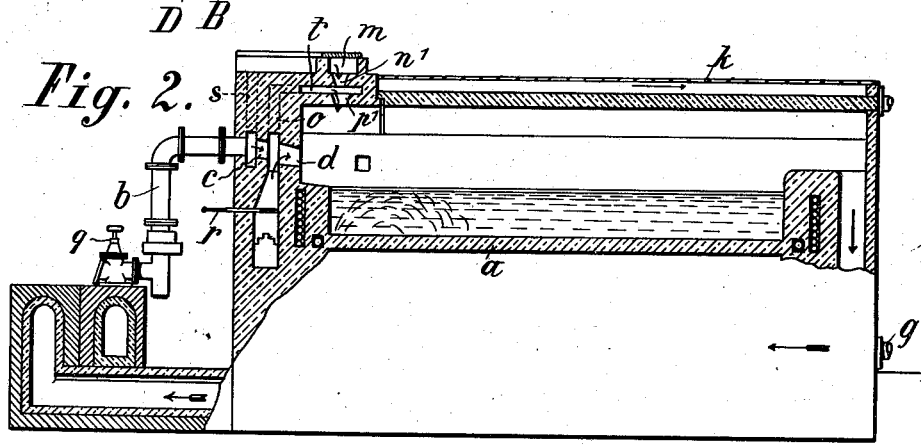
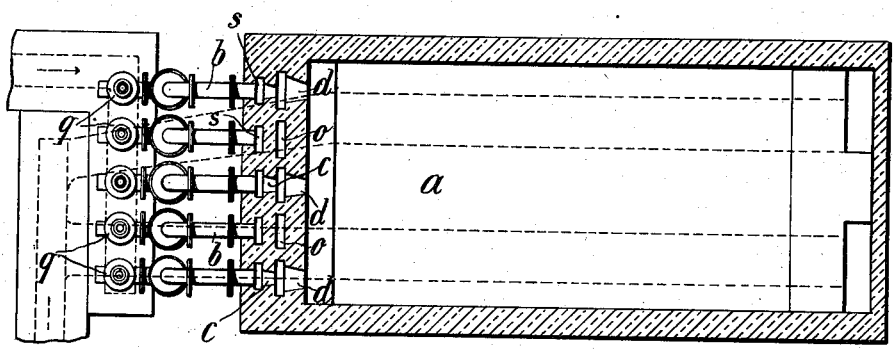

No. 881,724. PATENTED MAR. 10, 1908.
P. SCHMIDT & A. DESGRAZ.
METHOD OF WORKING GAS FURNACES.
APPLICATION FILED AUG. 3, 1905.

2 SHEETS—SHEET 2.

Witnesses:

Inventors
Paul Schmidt
Adolphe Desgraz

UNITED STATES PATENT OFFICE.

PAUL SCHMIDT AND ADOLPHE DESGRAZ, OF HANOVER, GERMANY.

METHOD OF WORKING GAS-FURNACES.

No. 881,724.  Specification of Letters Patent.  Patented March 10, 1908.

Application filed August 3, 1905. Serial No. 272,549.

*To all whom it may concern:*

Be it known that we, PAUL SCHMIDT and ADOLPHE DESGRAZ, engineers, subject and citizen of the German Empire and of Switzerland, respectively, residing at Hanover, Germany, have invented certain new and useful Improvements in Methods of Working Gas-Furnaces, of which the following is a specification.

Our invention relates to the working of flame furnaces, such as furnaces for smelting glass, steel, metals and other materials, puddling, welding, heating furnaces and the like, with which furnaces the mixtures of gas and air serving for obtaining the desired effects (f. i. for heating or smelting substances for producing chemical or mechanical reactions) are introduced at two or more places. The invention consists in introducing at the different places two or more prepared mixtures of gas and air, varying according to the different object in view during the different stages of working and the composition of each of which mixtures may be differently regulated during the working of the furnace.

With this purpose in view, at suitable places of the furnaces, f. i. at one of the end-walls, nozzles or rows of nozzles are arranged above each other or in any other suitable manner through which prepared and differently composed mixtures, consisting f. i. of combustible gases and air are introduced into the furnace; and the composition of these different mixtures may be regulated according to the varying effect to be attained from one or the other nozzle or row of nozzles. The nozzles may be arranged in any other suitable manner, f. i. in the upper or the side walls of the furnaces.

We will now describe our method by way of reference to the working of a furnace serving for smelting glass and to a puddling furnace of any known construction. When working glass furnaces the disadvantage has arisen that the liquid glass is of a very varying temperature at the different parts of the furnace and consequently is more or less liquid. The molten glass being used for the production of bottles a number of glass blowers work on the front, rear and sides thereof who take the glass from a corresponding number of working holes. But bottles of equal quality can only be obtained, if the temperature at all working holes is very nearly the same i. e. the glass is uniformly liquid.

Now, according to the present invention and in order to smelt the raw materials and to maintain the molten glass at a most even temperature at all parts of the furnace there is directed towards the raw materials charged into the furnaces a current of gas with an excess of air in order to first produce the smelting temperature. A suitable distance behind the nozzle for the introduction of this gas mixture rich in air a further nozzle or set of nozzles is arranged through which a mixture of air with an excess of gas is injected. The two nozzles or sets of nozzles for the introduction of the two mixtures of air and gas may be arranged in a vertical or oblique manner to each other. By means of the excess of air of the firstly introduced mixture the excess of gas fed at the second nozzles or sets of nozzles is burned in the form of a long flame most evenly spreading over the entire contents of the furnace and keeping the molten glass at an almost uniform temperature. Whereas hitherto the difference of the temperature in a glass furnace of a length of 9 m often was 100° C and more at the first and last working holes, according to our method this difference is but about 26—30° C.

On the accompanying drawing we have illustrated by way of example two furnaces for carrying our method into effect and which furnaces serve for smelting glass.

Figure 5:
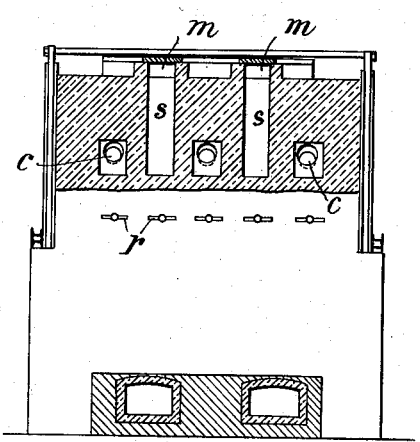
Figure 6:
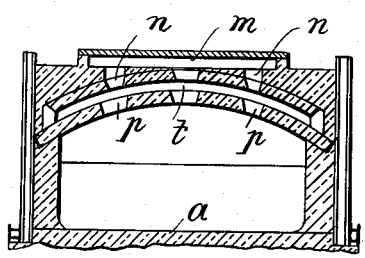

Figure 1 is a vertical longitudinal section of one modification. Fig. 2 a similar section of another modification. Fig. 3 is a horizontal longitudinal section on line E—F of Fig. 1. Fig. 4 a vertical cross section on line A—B of Fig. 1. Fig. 5 is a vertical cross section on line C—D of Fig. 1. Fig. 6 is a vertical cross section on line G—H of Fig. 1.

In the end wall of the furnace $a$ next to the feed place of the raw materials to be melted, nozzles $d$ are arranged in a suitable distance from the bottom and at a suitable angle to the latter. With these nozzles channels $f$ are in communication made in the furnace wall and serving for passing the mixtures of air and gas to the nozzles. Behind the nozzles $d$ nozzles $c$ are arranged with which communicate the pipes $b$ for supplying the gas and provided with valves $g$ in order to regulate the introduction of the gas to each nozzle c. The channels f are provided with slide valves r in order to control the supply of the air currents.

In the upper wall of the furnace channels k may be arranged serving for supplying and heating the combustion air which by means of a fan h is then passed through the pipe i or through channels in the rear wall to pipe g and thence to the channels f. With the nozzles n the channels s and m, and with the nozzles p the channels o and t are in communication.

Through the nozzles c, d a combustible mixture is introduced, having an excess of air and serving for heating and smelting the raw materials, and through the nozzles n, p a combustible mixture having an excess of gas is supplied, in order to form from the nozzles n, p a long flame, maintaining the heated or molten material at an almost uniform temperature at all parts of the furnace.

Instead of arranging the second nozzles n, p at a longer distance from the nozzles c, d, the former according to Fig. 2 may be arranged shortly above the latter, so that the mixture fed through the nozzles n', p' mixes with the gas mixture supplied through the nozzles c, d or the combustion products thereof immediately after the first mixture has acted on the material to be treated, in order to form a long flame.

The invention may further be applied with advantage for carrying out the puddling process, with which the raw iron is also to be first melted. In one of the end walls of any puddling furnace nozzles or rows of nozzles are arranged above each other which serve for supplying the mixtures of air and gas. During the time of smelting the raw iron an excess of oxygen is to react oxidizingly on the smelting material, in order to burn the silicium. But on the other side the average temperature in the furnace should not be too high so that the slag covering the molten iron would not become too liquid and would quickly flow together again when stirring the bath, as otherwise the oxidizing action of the furnace gases would be greatly impeded. Therefore in the beginning of the process, through the lower nozzles a mixture with an excess of air and through the upper nozzles a mixture with an excess of gas are supplied. Consequently, we work oxidizing at the lower, and reducing at the upper nozzles. After the manganese and a certain amount of the iron have been oxidized, by degrees the oxidation of the carbon commences. Now, the temperature in the furnace will have to be increased and therefore we work on all nozzles with a large excess of air. The more the oxidation of the carbon is progressing, the less liquid the iron becomes, and its smelting temperature exceeds finally the temperature prevailing in the furnace. Consequently, the metal begins to harden and is welded to clumps which will have to be broken again several times, as the iron is not uniformly decarbonized and the inner parts of the clumps will again have to be brought in contact with the oxygen. During this part of the process the temperature needs no longer be as high as before, whereas on the hearth there must still be a certain excess of oxygen. During this stage of the process therefore we work at the upper nozzles or rows of nozzles with an oxidizing flame. During the balling-up now following, once more a high temperature is required, in order to separate the slags from the balls and to make the slags flow. Therefore during this last part of the process we again work on all nozzles or rows of nozzles with an oxidizing flame.

We have described our method with reference to working a glass and a puddling furnace. But it will be understood that it may be applied in a corresponding manner to all other flame furnaces.

We claim:

1. A method of maintaining a body of molten material within a furnace at a uniform temperature throughout which consists in subjecting the material to the action of a heating flame which spreads in an even manner entirely over the material by introducing into the furnace a mixture of combustible gas and air, the latter being in excess of the former, and further introducing into the furnace a mixture of combustible gas and air, the former being in excess of the latter, said excess of air of the first mixture causing the excess of gas of the second mixture to be burned in the form of a long flame which evenly spreads entirely over the material.

2. A method of maintaining a body of molten material within a furnace at a uniform temperature throughout which consists in subjecting the material to the action of a heating flame which spreads in an even manner entirely over the material by introducing into the furnace a mixture of combustible gas and air, the latter being in excess of the former, and further introducing into the furnace below the point of introduction of the first mixture another mixture of combustible gas and air, the former being in excess of the latter, said excess of air of the first mixture causing the excess of gas of the second mixture to be burned in the form of a long flame evenly spreading entirely over the material.

3. A method of maintaining a body of molten material within a furnace at a uniform temperature throughout which consists of subjecting the material to the action of a heating flame, which evenly spreads entirely over the material by introducing into the furnace through one end thereof a mixture of combustible gas and air, the latter being in excess of the former, and further introducing into the furnace through the same end thereof a mixture of combustible gas and air, the former being in excess of the latter, said excess of air of the first mixture causing the excess of gas of the second mixture to be burned in the form of a long flame evenly spread entirely over the material.

In testimony whereof we have hereunto set our hands in presence of two subscribing witnesses.

PAUL SCHMIDT.
ADOLPHE DESGRAZ.

Witnesses:
OTTO NEIHLENDAM,
EMIL REUTHS.